United States Patent
Morabit

(10) Patent No.: US 10,433,487 B2
(45) Date of Patent: Oct. 8, 2019

(54) WALK-BEHIND MOWER/TRIMMER WITH 360 DEGREE MANEUVERABILITY

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 79 days.

(21) Appl. No.: 15/134,580

(22) Filed: Apr. 21, 2016

(65) Prior Publication Data

US 2016/0309653 A1 Oct. 27, 2016

Related U.S. Application Data

(60) Provisional application No. 62/150,350, filed on Apr. 21, 2015.

(51) Int. Cl.
*A01D 34/416* (2006.01)
*A01D 69/02* (2006.01)
*A01D 34/74* (2006.01)
*A01D 101/00* (2006.01)

(52) U.S. Cl.
CPC ......... *A01D 69/025* (2013.01); *A01D 34/416* (2013.01); *A01D 34/74* (2013.01); *A01D 2101/00* (2013.01)

(58) Field of Classification Search
CPC .... A01D 34/416; A01D 69/025; A01D 34/74; A01D 2101/00
See application file for complete search history.

(56) References Cited

U.S. PATENT DOCUMENTS

| | | | | |
|---|---|---|---|---|
| 2,502,696 A | * | 4/1950 | Barnes | A01D 57/01 16/437 |
| 2,669,826 A | * | 2/1954 | Watrous | A01D 34/63 16/42 R |
| 4,024,695 A | * | 5/1977 | Haseloff | A01D 34/685 180/19.2 |
| 4,033,098 A | * | 7/1977 | Green | A01D 34/416 172/258 |
| 4,077,191 A | * | 3/1978 | Pittinger, Sr. | A01D 34/416 30/276 |
| 4,232,505 A | * | 11/1980 | Walto | A01D 34/416 56/12.7 |
| 4,329,834 A | | 5/1982 | Hetrick | |
| 4,718,221 A | | 1/1988 | Wessel et al. | |
| 4,796,415 A | * | 1/1989 | Moore | A01D 34/416 56/16.7 |
| 4,909,024 A | * | 3/1990 | Jones | A01D 34/63 56/12.7 |
| 4,949,536 A | | 8/1990 | Neufeld | |
| 5,070,685 A | | 12/1991 | Galt | |
| 5,313,770 A | * | 5/1994 | Smothers | A01D 34/416 30/276 |

(Continued)

*Primary Examiner* — Alicia Torres
*Assistant Examiner* — Adam J Behrens
(74) *Attorney, Agent, or Firm* — Nixon & Vanderhye P.C.

(57) ABSTRACT

A walk-behind mower/trimmer includes one or more cutting heads secured to a deck supporting frame and supported on a glider disk. A rear support and handle assembly facilitate operator use and control of the mower/trimmer. The heads may be powered using a gas motor, an electric motor, or a hybrid.

16 Claims, 12 Drawing Sheets

(56) References Cited

U.S. PATENT DOCUMENTS

| | | | | |
|---|---|---|---|---|
| 5,367,862 | A * | 11/1994 | Spear | A01D 34/416 30/296.1 |
| 5,572,856 | A | 11/1996 | Ku | |
| 5,862,655 | A * | 1/1999 | Altamirano | A01D 34/001 56/12.1 |
| 5,906,051 | A * | 5/1999 | Nannen | A01D 34/4163 30/276 |
| 5,996,233 | A * | 12/1999 | Morabit | A01D 34/4168 30/276 |
| 6,185,916 | B1 * | 2/2001 | Johnson | A01D 34/416 56/12.7 |
| 6,314,848 | B2 * | 11/2001 | Morabit | A01D 34/4168 30/276 |
| 6,427,429 | B1 * | 8/2002 | Brabenec | A01D 34/76 56/12.7 |
| 6,487,838 | B2 | 12/2002 | Handlin | |
| 6,494,427 | B1 * | 12/2002 | Smith | A01D 34/001 224/401 |
| 6,546,706 | B1 | 4/2003 | Nafziger | |
| 6,601,374 | B2 | 8/2003 | Smith | |
| 6,729,116 | B1 * | 5/2004 | Graus | A01D 34/74 280/43.13 |
| 6,786,030 | B2 | 9/2004 | Nafziger | |
| 6,971,223 | B2 * | 12/2005 | Scott | A01D 34/74 30/276 |
| 7,398,637 | B1 | 7/2008 | Sevey | |
| 7,677,344 | B2 | 3/2010 | Medina et al. | |
| 7,712,293 | B1 | 5/2010 | Recker | |
| 7,950,211 | B1 * | 5/2011 | Ta | A01D 34/416 56/12.7 |
| 7,975,459 | B1 | 7/2011 | Murawski | |
| 8,186,135 | B2 * | 5/2012 | Leonardi | A01D 34/416 56/12.7 |
| 8,418,371 | B2 * | 4/2013 | Hoelscher | A01D 34/90 30/276 |
| 8,464,504 | B1 | 6/2013 | Huff | |
| 8,615,975 | B2 * | 12/2013 | Haraqia | A01D 34/828 241/101.75 |
| 8,863,485 | B2 * | 10/2014 | Pitcel | A01D 69/025 56/10.2 R |
| 8,973,343 | B2 | 3/2015 | Bell | |
| 9,427,859 | B2 * | 8/2016 | Maynez | B25F 5/00 |
| 2010/0326032 | A1 * | 12/2010 | Leonardi | A01D 34/416 56/17.1 |
| 2014/0338202 | A1 * | 11/2014 | Morabit | A01D 34/902 30/275.4 |

* cited by examiner

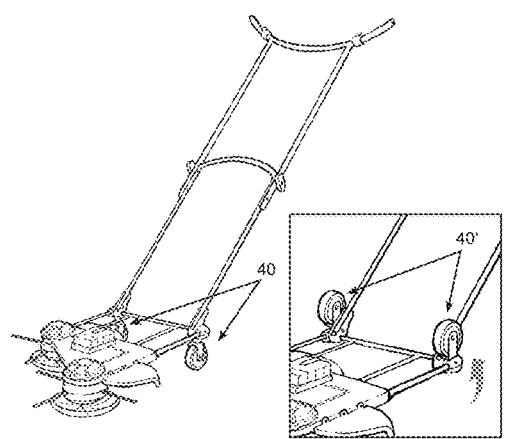
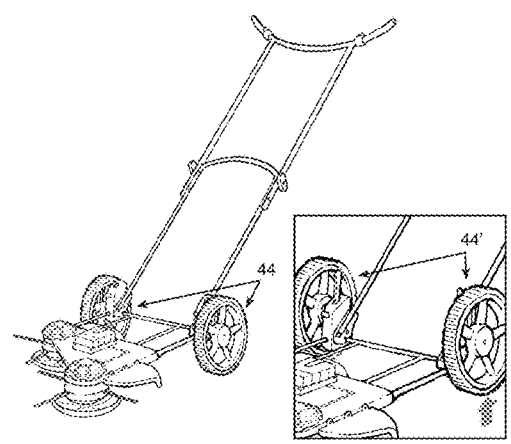
FIG. 4
FIG. 5

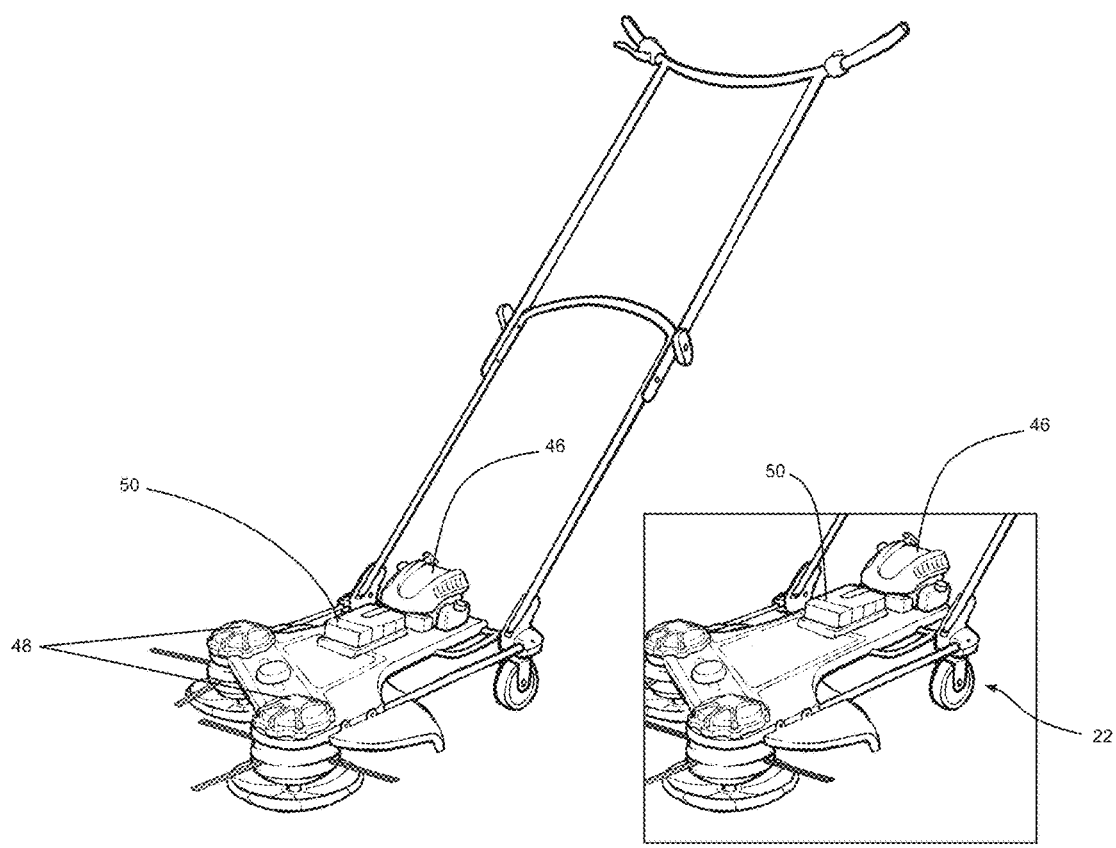

WALK-BEHIND MOWER/TRIMMER WITH 360 DEGREE MANEUVERABILITY

CROSS-REFERENCES TO RELATED APPLICATIONS

This application claims the benefit of U.S. Provisional Patent Application No. 62/150,350, filed Apr. 21, 2015, the entire content of which is herein incorporated by reference.

STATEMENT REGARDING FEDERALLY SPONSORED RESEARCH OR DEVELOPMENT (Not Applicable)

BACKGROUND OF THE INVENTION

The invention relates to a mower/trimmer assembly and, more particularly, to a walk-behind mower/trimmer assembly with various configurations, control options and features.

Existing metal blade lawn mowers, whether walk-behind or operator ride-on, require and currently provide supporting wheels located beyond the cutting swath of the blade(s). Such mowers also require a heavy protective deck to shield the operator from dangerous blade contact, thrown rocks, and debris. A grass chute may be built into the deck to enable a directed discharge of cuttings. The rotary mowing process requires substantial horsepower from bigger and more powerful motors to effectively lift, cut, and discharge grass. To further protect the operator from foot and hand injuries, the operator is confined within an operator zone, and the direction of movement of a wheeled mower along a lawn is restricted to rolling along the ground in a forward direction, thus lacking side to side motion versatility, further incorporating cumbersome turning radii. As a result of all these requirements, mowers are heavy and highly restricted to directions that require a zone restrictive operator position. Additionally, complex operator zones combined with multiple on/off safety controls are needed to trigger quick stopping of the rotating blade in order to protect an operator who may attempt to clear a clogged grass chute at the mower deck's discharge. Further, because of the necessary protective metal deck, its solid blade cannot reach beyond the protective deck to cut and trim next to trees or fixed objects. Further, the supporting wheels become an additional barrier when trying to mow closer to surrounding objects.

Thus, a secondary trimming process is required with a handheld flexible line grass trimmer. Existing grass trimmers generally include a main rod that supports a rotatable trimmer head and an engine or electric motor. Handles and trigger controls are strategically positioned on the rod to facilitate operator use and control of the trimmer head and speed. The operator typically supports the weight of the trimmer and hovers the trimmer head over a cutting area. Since the operator supports the weight of the trimmer, it is a strenuous effort, and difficult to maintain a consistent cutting height. Such trimmers are typically used for specialized finishing purposes such as edging walks or pathways, trimming up close to trees and prior mowing obstacles, or cutting areas not easily accessible with a mower. Additionally, the weight of the trimmer and required maneuvering forces can be extremely burdensome and taxing when used over long periods of time.

Existing flexible line trimmers for finish work after mowing may be powered with gas or battery-powered motors. Gas engine trimmers are more powerful and last longer but are noisy and heavy. Battery-powered trimmers typically have limited power capabilities and limited use times due to quickly exhausted battery charges. Longer lasting batteries can be heavy and expensive.

It would be desirable to overcome these drawbacks while still benefiting from the advantages associated with line trimmers and mowers.

BRIEF SUMMARY OF THE INVENTION

An objective of the described embodiments is to eliminate the common barriers and disadvantages of both rotary mowers and grass trimmers, allowing the mower/trimmer to mow and trim in one pass without such existing disadvantages. A walk-behind mower/trimmer assembly according to the described embodiments utilizes two or more trimmer heads supported on a lightweight deck supporting frame and incorporating glider disks and/or other support components to facilitate operation. The assembly may include two or more cutting heads, which may be angularly positioned relative to each other. A ground-supported glider disk may be provided below each cutting head with glider extensions, and additional support options are cooperable with the deck supporting frame. Exemplary support options may include rear lift supports such as retractable rear swivel wheels, glider disks, fixed axle wheels and the like. Additionally, the cutting heads may be belt driven or driven individually by direct drive with optional clutches and hand controls. Power options may include individual AC or DC electric, gas motor powered, or combination hybrid gas/DC electric. The assembly may also include self-propelled options as well as GPS directional control.

In an exemplary embodiment, a walk-behind mower/trimmer includes a deck supporting frame, a handle assembly attached to the deck supporting frame, and at least two motorized rotating cutting heads coupled with the deck supporting frame. The cutting heads are provided with at least one flexible cutting line extending from and rotated by the cutting head. A glider disk, free of rotational powering, is positioned below each of the cutting heads and act as first and second supports for the mower/trimmer. A rear support system coupled with the deck supporting frame acts as a third support for the mower/trimmer, and a power source is operatively coupled with the cutting heads. With two cuttings heads, one of the two cutting heads may be positioned forward of the other. Additionally, the rear support system may include a single swivel wheel positioned behind the cutting heads.

In some embodiments, the glider disk may be height adjustable to adjust a cutting height of the cutting line. The rear support system may include at least one swivel wheel positioned behind the cutting head. The rear support system may include at least one glider disk positioned behind the cutting head. The rear support system may include a pair of fixed axle height adjustable wheels positioned behind the cutting head.

The power source may include a DC electric motor coupled with a battery, an AC electric motor, a gas motor, or a hybrid gas powered motor and DC electric motor. The hybrid gas powered motor and DC electric motor may be configured to be selectively operated using operator controls. The hybrid gas powered motor and DC electric motor may be configured to activate the gas powered motor based on operating characteristics of the cutting head. For example, the hybrid gas powered motor and DC electric motor may be configured to activate the gas powered motor at a predefined cutting line RPM and/or to activate the gas powered motor when a working amperage exceeds a predefined amperage, and/or when the battery charge has been depleted.

The cutting line may include an aerodynamic or non-symmetrical cross-section. The flexible blades may be configured to be pitched to draw and lift grass upward for cleaner precision cutting and mowing.

In some embodiments, the power source may be secured to the deck frame, and the power source may be positioned rearward of the rear support system as a counterbalancing force to reduce the central weight applied onto the gliders for easier progress through heavier vegetation. Further, in the same intent, the push handle may be positioned at an elevated distance above the deck to reduce downward forces onto the gliders that result during push mowing. The mower/trimmer may include a self-propelled drive system coupled with the deck frame. In this context, the self-propelled drive system may include a GPS module for mowing along predetermined paths without need for an operator. It may also include remote controlled operation.

In another exemplary embodiment, a walk-behind mower/trimmer includes a deck supporting frame, a handle assembly attached to the deck supporting frame, and a pair of motorized rotating cutting heads coupled with the deck supporting frame. The cutting heads include at least one cutting line extending from and rotated by the cutting heads. A glider disk is positioned below each of the cutting heads. A rear support system coupled with the deck supporting frame includes one of a swivel wheel, a fixed axle wheel, and a glider disk. A hybrid gas/battery powered motor is operatively coupled with the cutting heads for driving the cutting heads.

BRIEF DESCRIPTION OF THE DRAWINGS

These and other aspects and advantages will be described in detail with reference to the accompanying drawings, in which:

FIGS. 2-5 show the mower/trimmer with alternative supporting options;

FIGS. 11 and 12 show alternative configurations utilizing the hybrid motor;

DETAILED DESCRIPTION OF THE INVENTION

Figure 1:
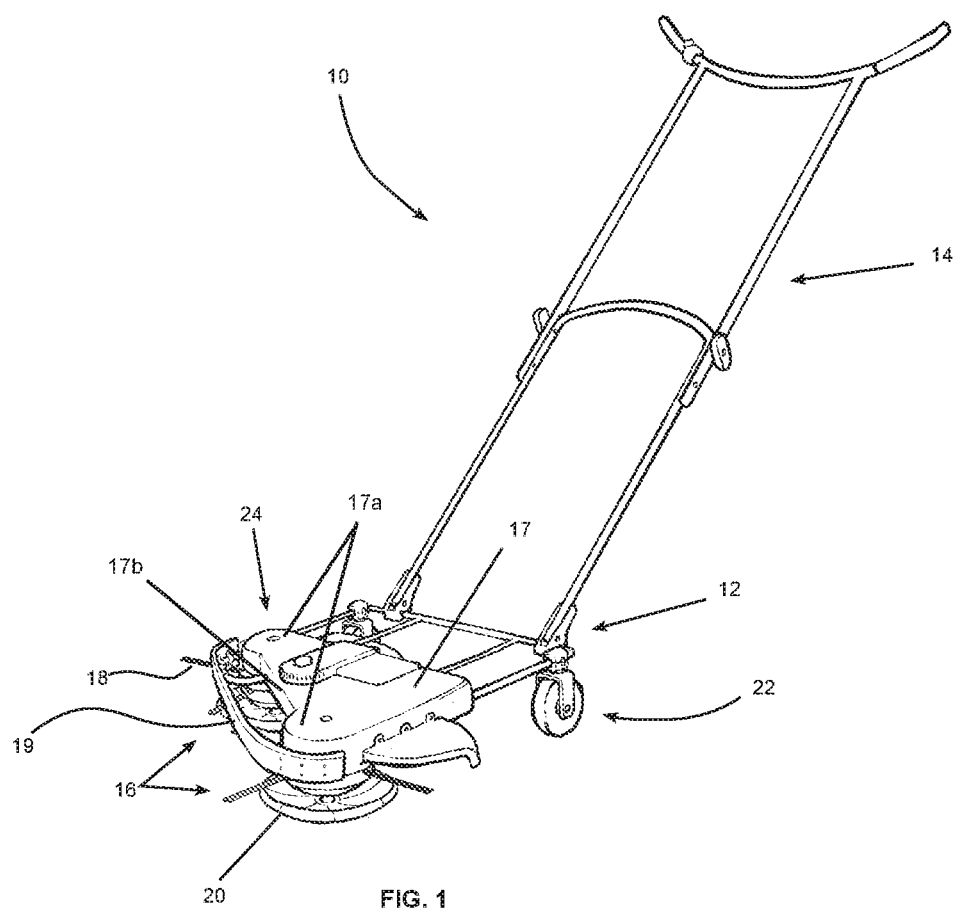
FIG. 1 shows an exemplary walk-behind mower/trimmer according to some of the described embodiments.

FIG. 1 is a perspective view of an exemplary walk-behind mower/trimmer 10. The assembly includes a deck supporting frame 12 formed using any suitable material such as aluminum or stainless steel tubing or the like. A handle assembly 14 is attached to the deck supporting frame 12. Two or more motorized rotating cutting heads 16 are coupled with the deck supporting frame 12 (two cutting heads 16 shown in FIG. 1) and positioned in a housing 17. With the two cutting heads 16 shown in FIG. 1, one of the cutting heads 16 may be positioned forward of the other cutting head 16. Reference to "forward" and "rearward" are relative to the handle assembly 14 in a position of the operator "behind" the mower/trimmer. The housing 17 includes cutting head sections 17a over the two cutting heads 16, respectively, and a forward section 17b extending at an angle in a substantially straight line between the cutting head sections 17a. Each of the cutting heads 16 is provided with one or more flexible cutting lines 18 extending from and rotated by the cutting heads 16. The cutting line(s) 18 extend beyond the deck to eliminate the common interferences of existing rotary mowers to provide for mowing and trimming with a single tool. A protective barrier plate strip 19 may be secured to the deck supporting frame forward of the cutting heads 16 to reduce impact wear and tear on the glider when impacting barriers such as walls, posts or other impediments.

A glider disk 20 is positioned below each of the cutting heads 16. The glider disk 20 is not powered but is 'free-wheeling' and acts as a first support for the mower/trimmer 10. The glider disks 20 rest the trimmer on the ground to effectively control the mower/trimmer's weight and cutting height during use. The glider disks 20 may be adjustable to adjust a cutting height of the cutting lines 18. Details of the glider disk 20 and the glider assembly securing the disk to the cutting head are described in U.S. patent application Ser. No. 14/280,916, the contents of which are hereby incorporated by reference.

Figure 2:
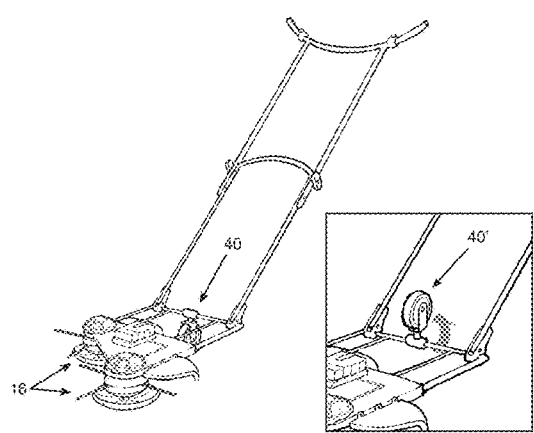
Figure 3:
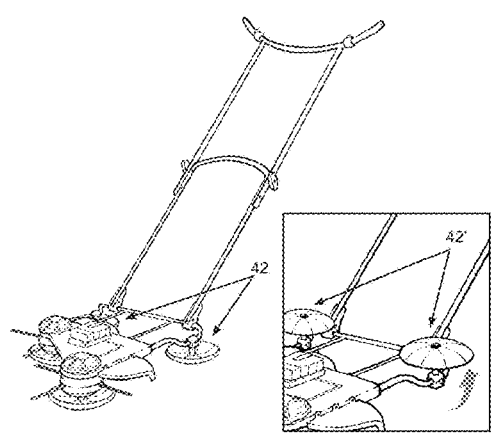

The mower/trimmer 10 also includes a rear support system 22 coupled with the deck supporting frame 12 that acts as a second support for the mower/trimmer 10. FIGS. 2-5 show alternative mobility configurations for the rear support assembly 22. FIG. 2 shows the use of a single swivel wheel 40, which is most suitable for use with at least two cutting heads 16. FIG. 3 shows the use of dual glider plates 42 as part of the rear support assembly 22. FIG. 4 illustrates the use of dual swivel wheels 40, and FIG. 5 shows larger fixed axle wheels 44, which are preferably height-adjustable. As shown, the various alternative rear support components are positioned behind the cutting heads 16.

Each of the wheeled mobility configurations can be fixed or retractable. Each of FIGS. 2-5 includes an inset showing the rear support assembly in a retracted position (i.e., swivel wheels 40', glider plates 42', fixed axle wheels 44'). With the rear support assembly 22 in a retracted position, the mower/trimmer can be supported by the gliders 20 cooperable with each cutting head 16 and with the operator providing tilt control with the handles 14.

Figures 6, 7, 8, 9:
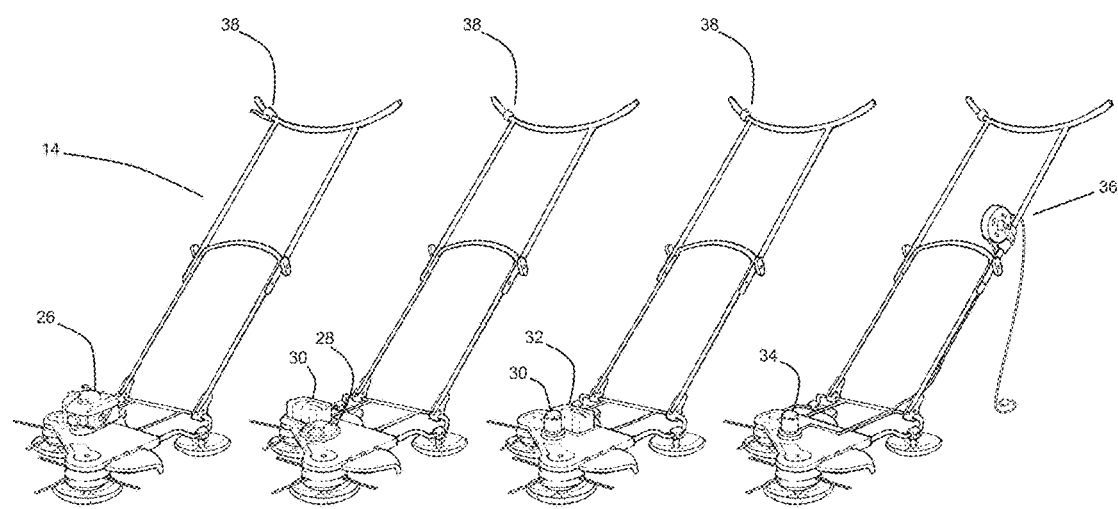
FIGS. 6-9 show the mower/trimmer with alternative powering options.

The cutting heads 16 are rotated for cutting by a suitable power source 24. FIGS. 6-9 show exemplary alternative the power sources for driving the rotating cutting heads 16. For example, the power source may include a gasoline engine 26 (FIG. 6), and/or combinations of a "flat" motor 28 and battery 30 (FIG. 7), a conventional DC (direct current) motor 32 and battery 30 (FIG. 8), or a conventional AC (alternating current) motor 34 and battery 30 (FIG. 9). Batteries may be rechargeable using an on-board solar panel. The flat motor 28 can deliver greater torque because of its higher magnetic field forces activated at larger radii than a conventional motor. There are no brushes in the flat motor as switching is done electronically for improved efficiency. The flat motor is compact and more powerful for its size, and is known as a 'Core' motor. A recent battery trimmer with this advanced compact motor technology has been released by TroyBilt (MTD, Hand Products Division, Tempe, Ariz.). With the conventional AC motor shown in FIG. 9, an AC power cord assembly 36 is also included, which may incorporate a cord winder or the like as shown. With continued reference to FIGS. 6-9, suitable motor and throttle controls 38 can be secured to the handle assembly 14 in the operator zone In some embodiments, the operator controls automatically close when the operator lets go of the handle at the operator station. When the operator releases the single or dual motor trigger controls, the motor(s) stops and the head ceases to rotate the cutting line. The trigger controls can be provided to produce a variable motor speed or a dual (high/low) speed, allowing the operator to control the desired speed of the line cutters. This provides the needed zone protection to have a stopped cutting line if the operator leaves the operator zone and approaches the cutting zone. Since there is no place to clog as with a conventional mower deck chute, and the cutting lines are flexible, the mower/trimmer of the described embodiments provides the same safety features of a common grass trimmer, while also meeting the intents of the A.N.S.I. (American National Standards Institute) safety requirements for rotary mowers.

The drive system may include belts or gears or be configured for direct motor drive. Motor power, for self-propelling, may also be provided to the rear wheels, which may be selectively retractable.

Figure 10:
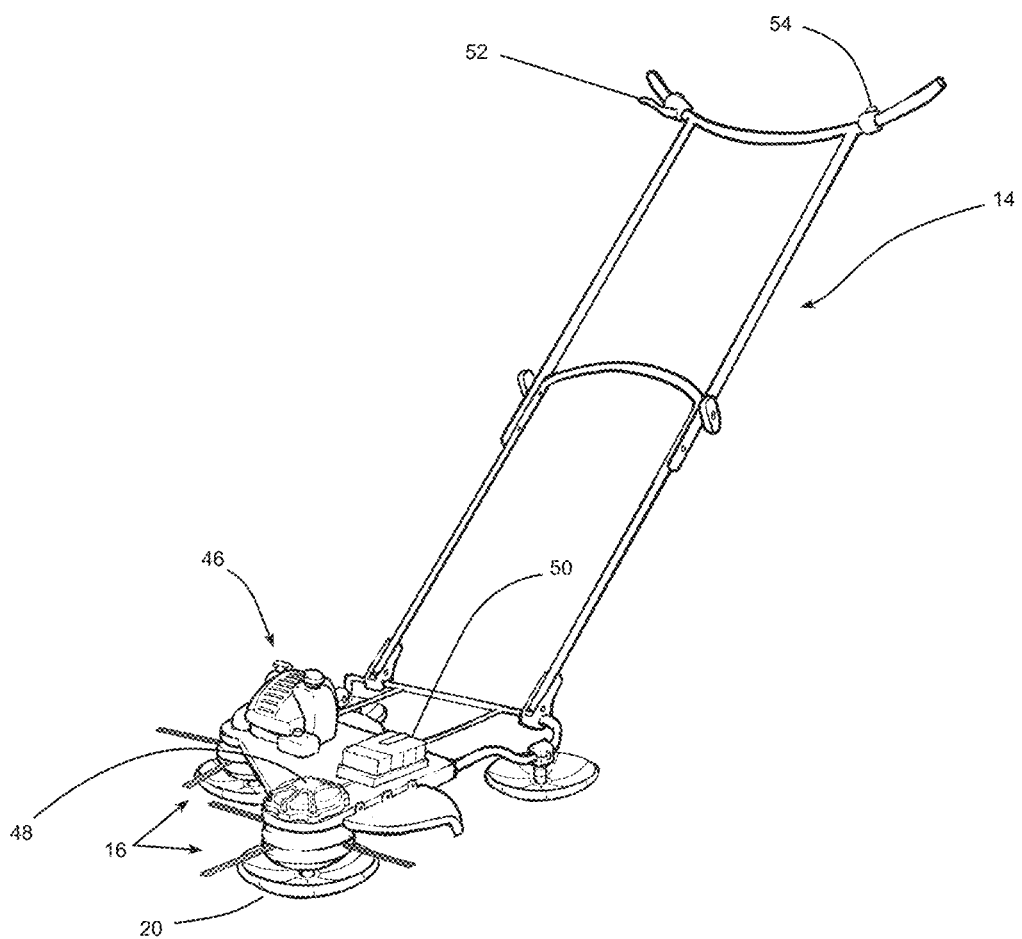
FIG. 10 shows an exemplary application utilizing a hybrid gas/electric motor.

In some embodiments, the mower/trimmer may be powered with a hybrid power source. FIG. 10 shows an exemplary embodiment with a gasoline and dual electric hybrid configuration incorporating a gasoline engine 46 and a flat or conventional motor 48. A battery 50 is cooperable with the electric motor 48. The handle assembly 14 includes both an engine throttle control 52 and a control 54 for the electric motor 48. With a clutch system at each motor, either motor can drive a common belt drive system to drive the heads that rotate the cutting lines. Accordingly, the operator can have control of each motor to operate either one independently as desired. The gas motor may be hand cranked, or electric start from the operator's station. When and if a battery charge is consumed, or if the grass cutting job requires power beyond the capability of the electric motor system, the gas motor can then be utilized with its own finger trigger controls as described above. The electric motor would not function if the gas motor was operating. When operating the electric motor system, the same trigger system may operate a variable or dual speed system.

Figure 13:
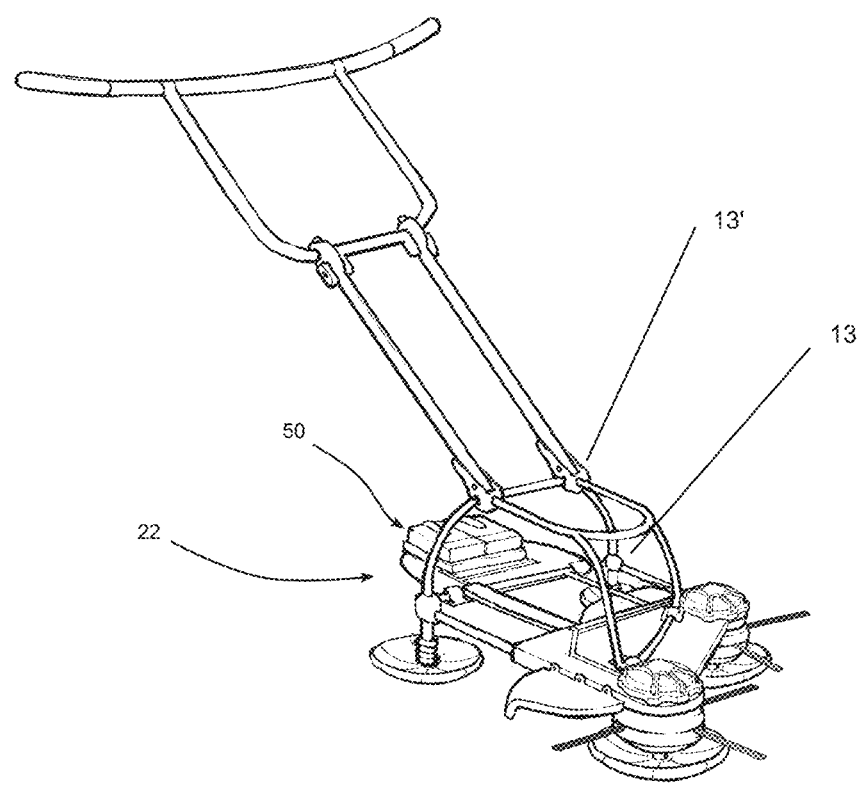
FIGS. 13, 13A and 13B show exemplary embodiments with batteries positioned to counterbalance some of the unit's weight onto the cutting head gliders, and elevated handle positioning, and reversed head position.

FIG. 11 shows another hybrid embodiment with two flat motors 48 and a gasoline engine 46. The gasoline engine 46 may be positioned rearward and over the rear wheel axle to reduce downward weight onto the gliders 20. As shown in FIG. 12, it may be desirable to position the engine 46 rearward of the rear support system 22 to provide counterbalance. FIG. 13 shows an alternative example with one or more batteries 50 positioned rearward of the rear support system 22, which in the embodiment shown in FIG. 13 includes a pair of glider disks. The batteries and/or motor can be positioned nearer to, over or beyond the rear wheels to limit weight and downward forces on the trimmer head glider disks. The motor and battery weight may be positioned to counterbalance with a desired net weight that effectively reduces glider disk sinking pressures that may tend to restrict the mower freedom of movement.

Figures 13A, 13B:
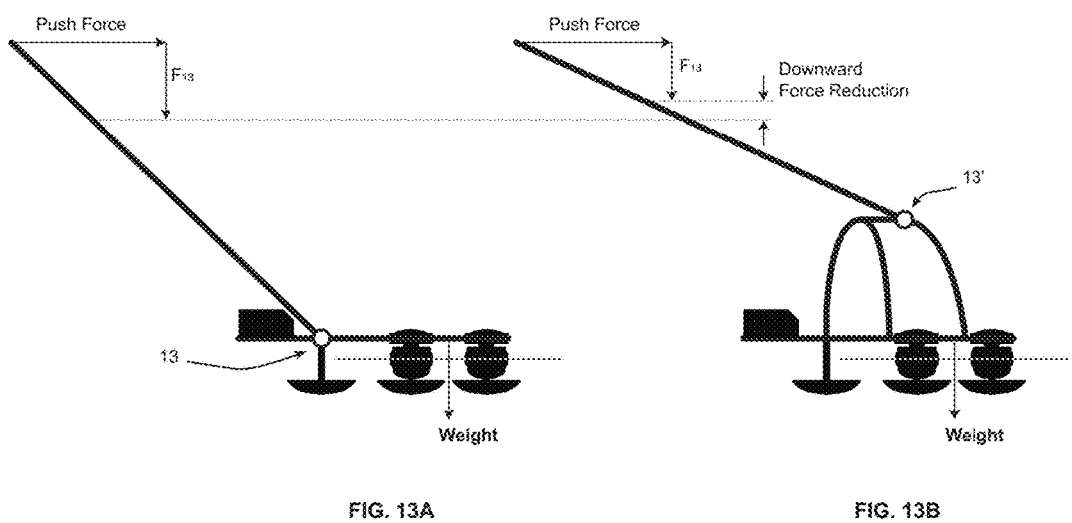

FIGS. 13, 13A and 13B also show additional embodiments that create less operator downward force onto the gliders generated from operator pushing forces down through the handle. By elevating the handle connection connecting point 13 (FIG. 13A) to connecting point 13' (FIG. 13B), lower downward push component forces will result as shown in the vector diagrams on FIGS. 13A and 13B, assuming the same beginning elevation of the handle at the operator station.

Figure 14:
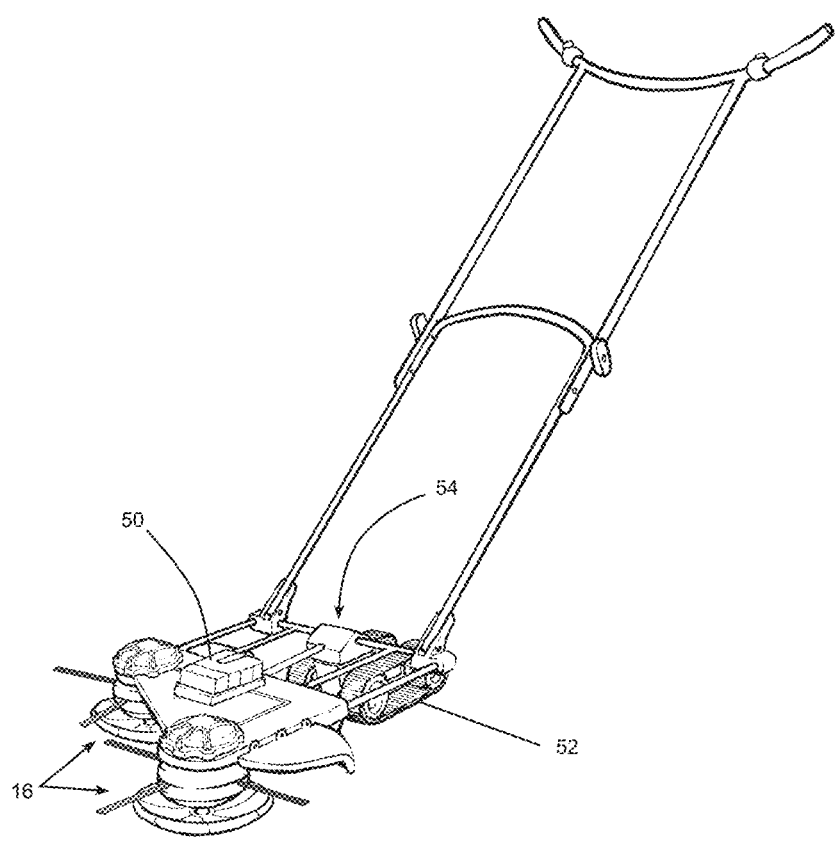
FIG. 14 shows a self-propelling tread driven and/or remote/GPS controlled embodiment.

FIG. 14 shows an exemplary configuration incorporating a self-propelled drive system using all-terrain treads or a similar type endless track 52. A GPS module and propulsion motor 54 may provide for a present controlled path of operation. The system may additionally or alternatively include a control module cooperable with the self-propelled drive system for a remote controlled operation. The GPS module and propulsion motor 54 are supported in a housing attached to the deck supporting frame as shown. The motor (either electric or gas) is coupled with the treads 52 to independently drive a left side tread and a right side tread. The independent drive provides for controlled steering. The battery 50 provides power for the propulsion motor or to a gear to provide the propulsion of the power sourcing motor. This arrangement is effective to mow steep hills or unreachable terrain, or to operate without an operator on preprogrammed GPS coordinates.

Figure 15:
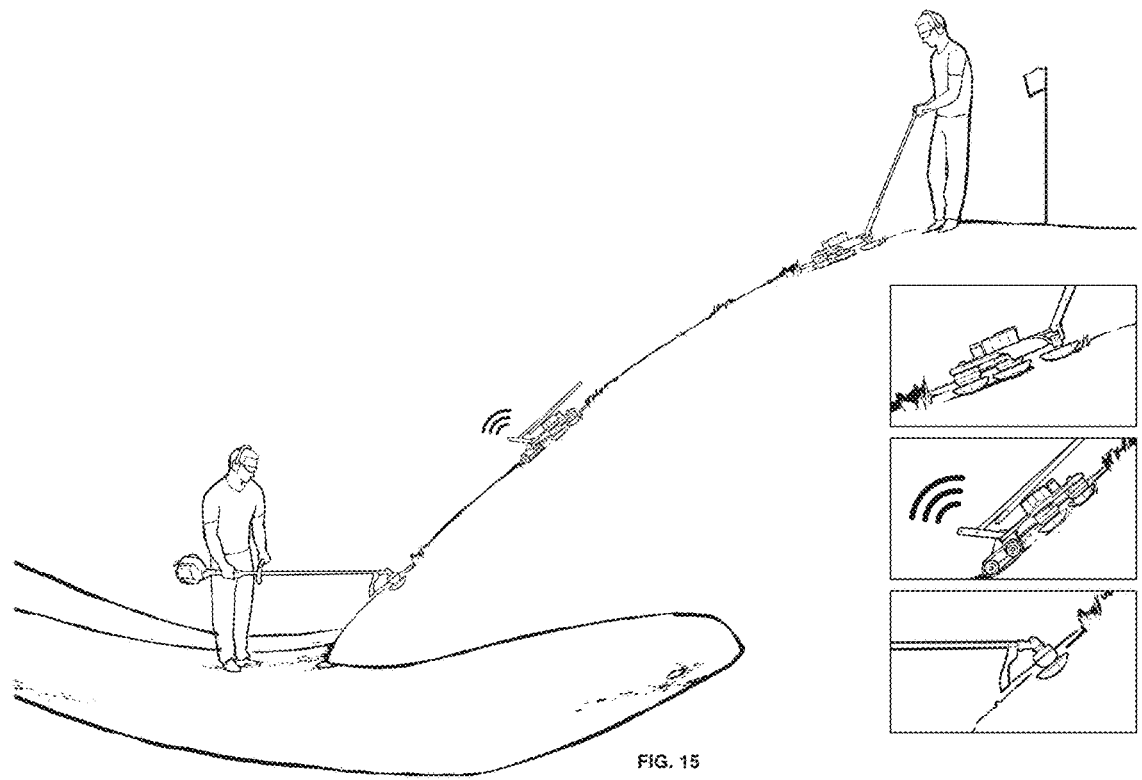
FIG. 15 shows exemplary applications of the mower/trimmer in a golf course setting.

FIG. 15 shows exemplary configurations of the assembly for applications around a golf course, in particular, a steep golf course bunker or sand trap. The operator on the left is utilizing a standard trimmer with a glider disk, and the operator on the right is using the walk-behind mower/trimmer of the described embodiments. The remote or GPS-controlled mower/trimmer is in use between the operators.

Figure 16:
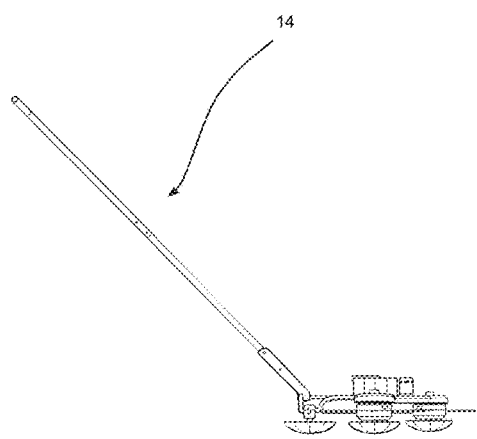
FIGS. 16-18 show an embodiment utilizing exemplary folding handles.
Figure 17:
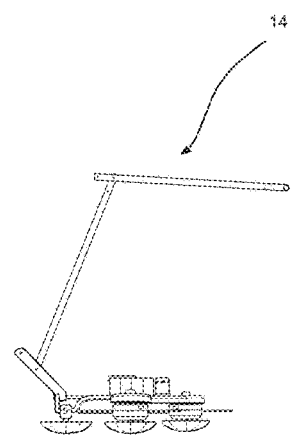
Figure 18:
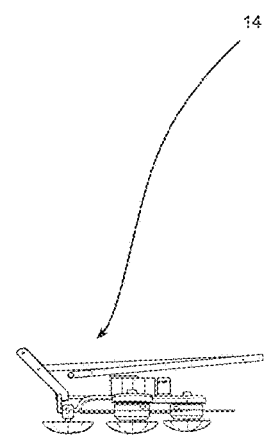

FIGS. 16-18 show an exemplary configuration of the mower/trimmer with folding handles. The handle assembly 14 can include pinned handle members with releasable connectors so that once released, the handles can be folded into the configuration shown in FIG. 18. The folded handles provide for a more compact device for storage, or the handles can be folded when the mower/trimmer is being used as a remote or GPS-controlled mower/trimmer.

Figure 19:
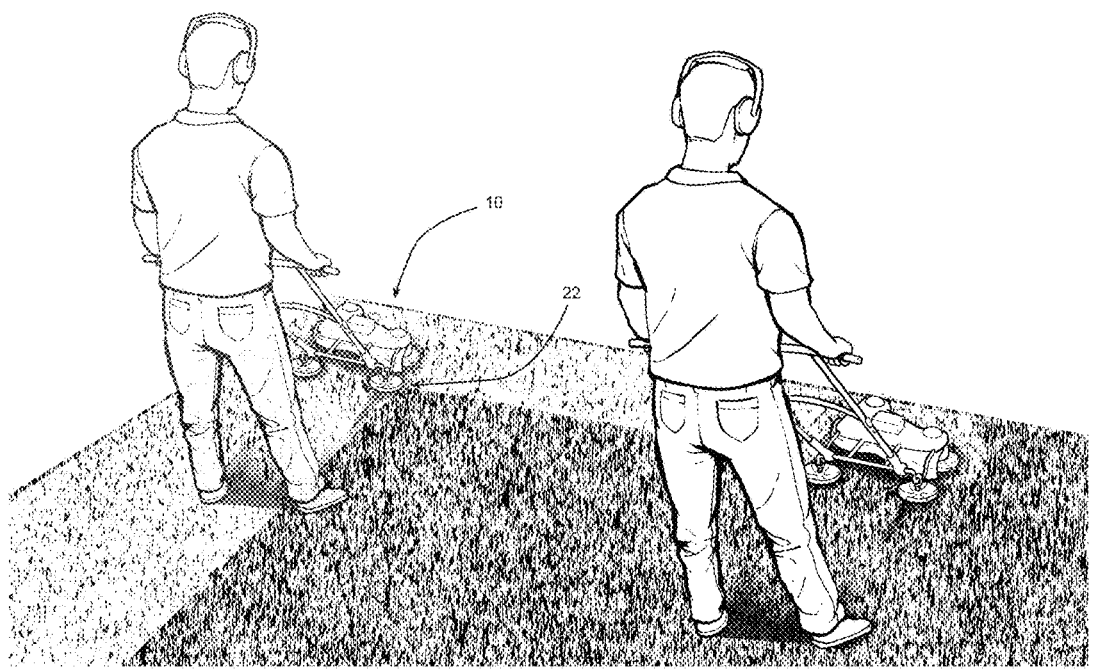
FIG. 19 shows an application of the mower/trimmer according to described embodiments.

FIG. 19 shows an exemplary use of the walk-behind mower/trimmer according to the described embodiments. As shown, the exemplary rear support 22 is in the form of glider disks. The mower/trimmer as shown can edge along a wall or fence and mow in the forward direction (left image in FIG. 19). The unit can then be moved along the wall (rightward in the image) without the operator having to reposition himself behind the mower/trimmer that is mowing perpendicular to the mower/operator centerline. A conventional lawnmower is not capable of such combined mowing and trimming and extended freedom into a full 360° maneuverability.

There are many advantages to the hybrid gas/electric motor in the context of the mower/trimmer of the described embodiments. An added gas motor option elevates power capabilities of the mower/trimmer for heavier jobs, which typically require high amperage. The added gas motor eliminates the need for bigger and heavier battery sizes, which also increase product costs. The gas motor can also be used when the battery charge has been depleted, thereby extending the use time. The system may be configured such that the electric or gas motor can be manually activated when desired from the operator controls. Alternatively, the system could be pre-programmed to engage and operate the gas motor at selective RPMs, e.g., 5000 RPMs or higher.

Alternatively, the system could be pre-programmed to activate the gas engine if the working amperage exceeds or spikes above a target level due to heavier loading. The system may be configured to activate the electric or gas motor according to various operating characteristics. The gas motor may be configured for an electric start or hand start. In the hybrid system, once the battery charge is consumed, the gas engine may be triggered to run at optional variable or selected speeds or by fixed throttle for constant speeds. The gas motor may alternatively be there only to charge the battery and/or to prevent a power outage while the battery only system powers the cutting heads. A driven electric motor powering a cutting head can also deliver a charge to the battery when the gas motor is operating. The hybrid system is further useful in communities sensitive to engine noise by having the convenience of a quiet battery/electric motor power source.

In some embodiments, the line blades 18 comprise flexible line blades that extend beyond the deck and outside of the glider disks to enable one-pass mowing and trimming. The line blades 18 may be conventional monofilament cutting lines or alternatively may be aerodynamic flexible line blades provided for lower drag efficiencies. The lines may be configured to create an updraft using non-symmetrical line blades for grass lift and assisted rotary mowing. Exemplary lines blades are described in U.S. Pat. No. 6,314,848, the contents of which are hereby incorporated by reference.

The mower/trimmer of the described embodiments overcomes the drawbacks of existing trimmers while enhancing functionality to match and exceed the capabilities of a traditional rotary lawn mower. The various power alternatives also provide operational advantages.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A walk-behind mower/trimmer comprising:
a deck supporting frame including a vertical centerline and a mower/trimmer forward direction centerline;
a handle assembly attached to the deck supporting frame;
at least two separately motorized rotating cutting heads coupled with the deck supporting frame, the cutting heads each including at least one cutting line extending from and rotated by the cutting heads, wherein one of the two cutting heads is positioned forward of the other of the two cutting heads;
a glider disk positioned below each of the cutting heads, the glider disks acting as first and second supports for the mower/trimmer, wherein the glider disks are the only forward support for the mower/trimmer;
a rear support system coupled with the deck supporting frame, the rear support system acting as a third support for the mower/trimmer, wherein with the glider disks and the rear support system engaging ground, the glider disks and the rear support system are configured to provide for 360° maneuverability about the vertical centerline as well as side-to-side, forward-backward and angles in-between maneuverability such that the mower/trimmer is maneuverable at least in a direction perpendicular to the mower/trimmer forward direction centerline directly from operating along the mower/trimmer forward direction centerline; and
a power source operatively coupled with the cutting heads.

2. A walk-behind mower/trimmer according to claim 1, wherein the rear support system comprises a single swivel wheel positioned behind the cutting heads.

3. A walk-behind mower/trimmer according to claim 1, wherein the glider disks are height adjustable to adjust a cutting height of the cutting line.

4. A walk-behind mower/trimmer according to claim 1, wherein the rear support system comprises at least one swivel wheel positioned behind the cutting heads.

5. A walk-behind mower/trimmer according to claim 1, wherein the rear support system comprises at least one glider disk positioned behind the cutting heads.

6. A walk-behind mower/trimmer according to claim 1, wherein the rear support system is retractable to a non-use position.

7. A walk-behind mower/trimmer according to claim 1, wherein the power source comprises at least one DC electric motor coupled with a battery.

8. A walk-behind mower/trimmer according to claim 1, wherein the power source comprises a gas powered motor and DC electric motor hybrid.

9. A walk-behind mower/trimmer according to claim 8, wherein the gas powered motor and DC electric motor hybrid is configured to be selectively operated using operator controls.

10. A walk-behind mower/trimmer according to claim 8, wherein the gas powered motor and DC electric motor hybrid is configured to activate the gas powered motor based on operating characteristics of the cutting head.

11. A walk-behind mower/trimmer according to claim 1, wherein the cutting line comprises a flexible line blade with an aerodynamic cross-section.

12. A walk-behind mower/trimmer according to claim 1, wherein the cutting line comprises a flexible line blade with a non-symmetrical cross-section.

13. A walk-behind mower/trimmer according to claim 1, wherein the cutting line comprises a flexible line blade that is shaped and/or oriented to create an updraft.

14. A walk-behind mower/trimmer according to claim 1, wherein the power source is secured to the deck supporting frame, and wherein the power source is positioned rearward of the rear support system.

15. A walk-behind mower/trimmer according to claim 1, wherein the deck supporting frame includes a housing with cutting head sections over the two cutting heads, respectively, and a forward section extending at an angle in a substantially straight line between the cutting head sections.

16. A walk-behind mower/trimmer according to claim 1, wherein the cutting line extending from and rotated by the cutting heads extends forward of the deck supporting frame.

* * * * *